United States Patent [19]

Long

[11] Patent Number: 4,511,024

[45] Date of Patent: Apr. 16, 1985

[54] MODULAR UNIT WITH FOLDABLE PANELS

[76] Inventor: Dennis L. Long, 2524 Santigo SE., Grand Rapids, Mich. 49506

[21] Appl. No.: 518,480

[22] Filed: Jul. 29, 1983

[51] Int. Cl.³ .............................................. B65G 47/00
[52] U.S. Cl. .................................... 198/346; 198/632; 312/258
[58] Field of Search ............... 198/346, 362, 372, 632, 198/860, 370, 339; 312/282, 241, 195, 258; 108/111, 69, 77

[56] References Cited

U.S. PATENT DOCUMENTS

| | | |
|---|---|---|
| 1,549,499 | 8/1925 | Parker . |
| 1,558,014 | 10/1925 | Jaenicke . |
| 1,959,735 | 5/1934 | Phillips . |
| 1,963,948 | 6/1934 | Adams ............................... 198/346 |
| 1,967,397 | 7/1934 | Cutler . |
| 2,122,969 | 7/1938 | Whitcomb ...................... 312/282 X |
| 2,523,829 | 9/1950 | Hubbell . |
| 2,594,295 | 4/1952 | Cushman . |
| 2,627,960 | 2/1953 | Eberle . |
| 3,126,236 | 3/1964 | Buchan et al. ................... 312/241 X |
| 3,191,745 | 6/1965 | Karcher et al. ................. 198/346 X |
| 3,220,527 | 11/1965 | Curtis . |
| 3,430,997 | 3/1969 | Propst . |
| 3,449,877 | 6/1969 | Beckman . |
| 3,876,060 | 4/1975 | Stease . |
| 3,920,299 | 11/1975 | Propst . |
| 3,936,110 | 2/1976 | Meggs et al. ........................ 312/241 |
| 4,043,626 | 8/1977 | Propst . |
| 4,067,631 | 1/1978 | Kelly . |

Primary Examiner—Joseph E. Valenza
Assistant Examiner—Jonathan D. Holmes
Attorney, Agent, or Firm—Ian C. McLeod

[57] ABSTRACT

Modular units including foldable panels are (22, 23) mounted on either side of a central divider, such as a conveyor surface (12) mounted on a frame (13). The modular units provide multiple work stations (15, 16, 17, 18, 19, 20) on either side of the central divider. The units are joined together to form a conveyor line for sequenced handling of various items in the work stations. The conveyor system is particularly adapted for materials handling.

14 Claims, 11 Drawing Figures

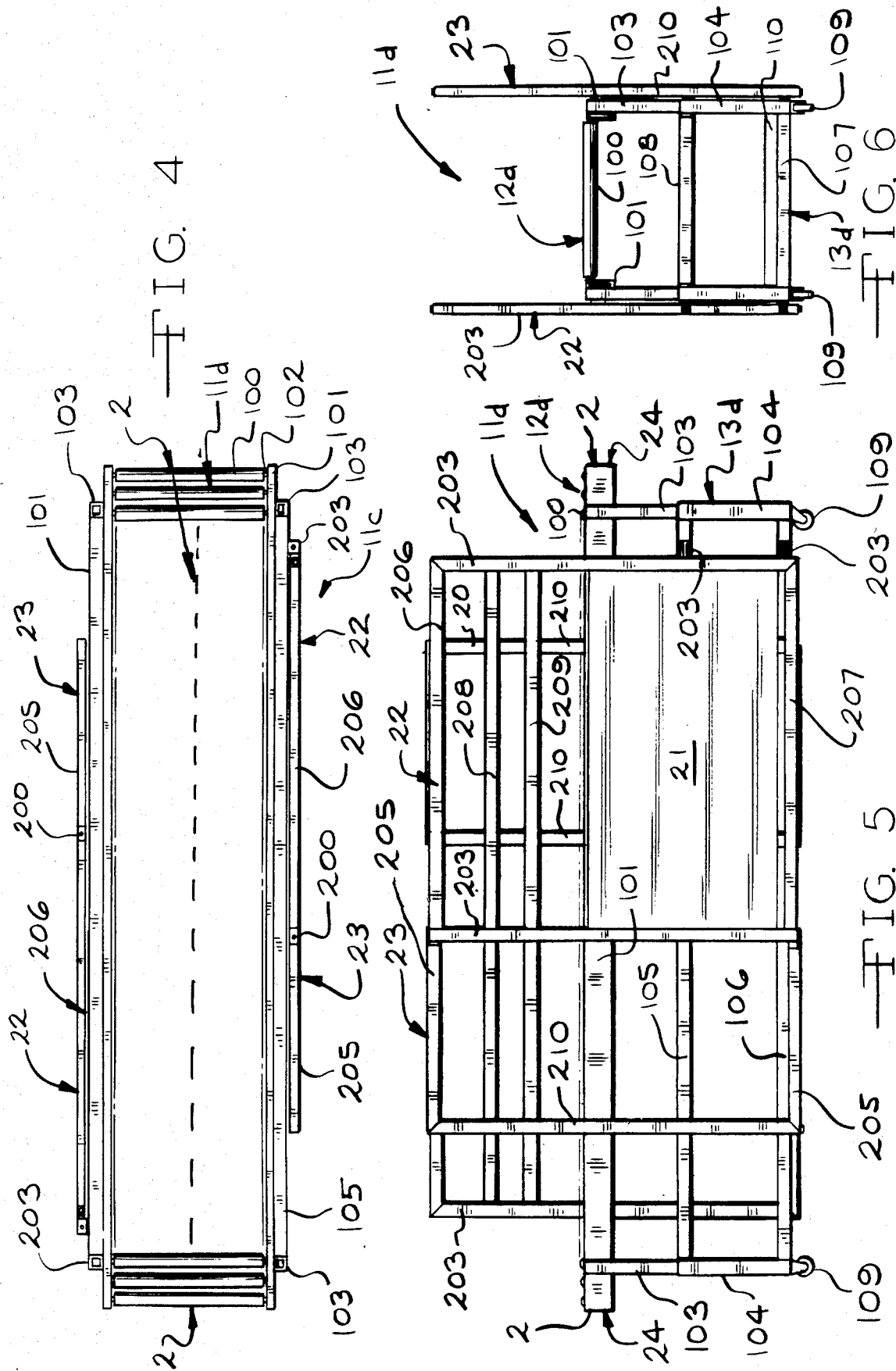

MODULAR UNIT WITH FOLDABLE PANELS

BACKGROUND OF THE INVENTION (1) Field of the Invention

The present invention relates to modular units including a combination of foldable panels (22, 23) mounted on a central divider, particularly a conveyor surface (12) mounted on a frame (13). In particular, the present invention provides modular units with horizontally moveable foldable panels and with a foldable work surface (21) mounted on one of the panels. The modular units can be combined to form a system.

(2) Prior Art

The prior art has described numerous types of tables mounted on a frame supporting a conveyor. Illustrative are U.S. Pat. Nos. 1,549,499 to Parker; 1,558,014 to Jaenicke; 2,523,829 to Hubbell and 2,627,960 to Eberle. Similarly the prior art has described segmented conveyor units which are portable and which can be joined together to form a conveyor system. Illustrative are U.S. Pat. Nos. 1,967,397 to Cutler; 1,959,735 to Phillips; 2,594,295 to Cushman; 3,220,527 to Curtis and 3,876,060 to Stease.

The problem with the prior art conveyor units and systems is that they do not provide a separate enclosed work area and work surface adjacent the conveyor surface. Further the work areas beside the units of the prior art conveyor units are not easily modifiable to allow for varying production line manufacturing requirements. Further still the prior art does not provide a conveyor unit with panels which define a separate work area and which can be folded for ease of movement of the system for storage or for repositioning.

The prior art has described modular systems. Illustrative are U.S. Pat. Nos. 3,920,299, 3,430,997 and 4,043,626 to Propst; 3,449,877 to Beckman and 4,067,631 to Kelley. Some of these patents also show space dividers which are joined together to form enclosures. Generally these systems involve panels which are locked together by fastening means and are not foldable into the conveyor unit. The result is that the panels are disassembled from the conveyor unit for repositioning. The conveyor units are then separately disassembled. Such modular systems are manufactured by Westinghouse in Grand Rapids, Mich., referred to as the ASD Modular Factory System, and by Herman Miller in Grand Rapids, Mich. and referred to as the Integrated Facility TM System. Such systems are satisfactory but are not easily repositioned.

OBJECTS

It is therefore an object of the present invention to provide a modular unit (11) with portable, foldable panels (22, 23) and with a central divider or conveyor (12) which provides one or more separate work areas (15, 16, 17, 18, 19, 20) defined by the panels. It is further an object of the present invention to provide a modular unit (11) which allows for adjustment of the position of the panels (22, 23) relative to each other along the length of the central divider or conveyor. Further still, it is an object of the present invention to provide a portable modular unit (11) which is readily and rapidly foldable and unfoldable to provide for repositioning. These and other objects will become increasingly apparent by reference to the following description and to the drawings.

IN THE DRAWINGS

FIG. 1a is an isometric view of one of the modular units (11d) illustrating two sets of foldable panels (22, 23) in the folded position for movement to a new position.

FIG. 4 is a plan view of the folded modular unit (11d) of FIG. 1a illustrating the foldable panels (22, 23) and the work surface (21) in the folded positions.

FIG. 5 is a front view of FIG. 4 showing the folded panels (22, 23) and work surface (21).

FIG. 6 is an end view of FIG. 5 further illustrating the folded panels (22, 23) and work surface (21).

GENERAL DESCRIPTION

Figure 1:
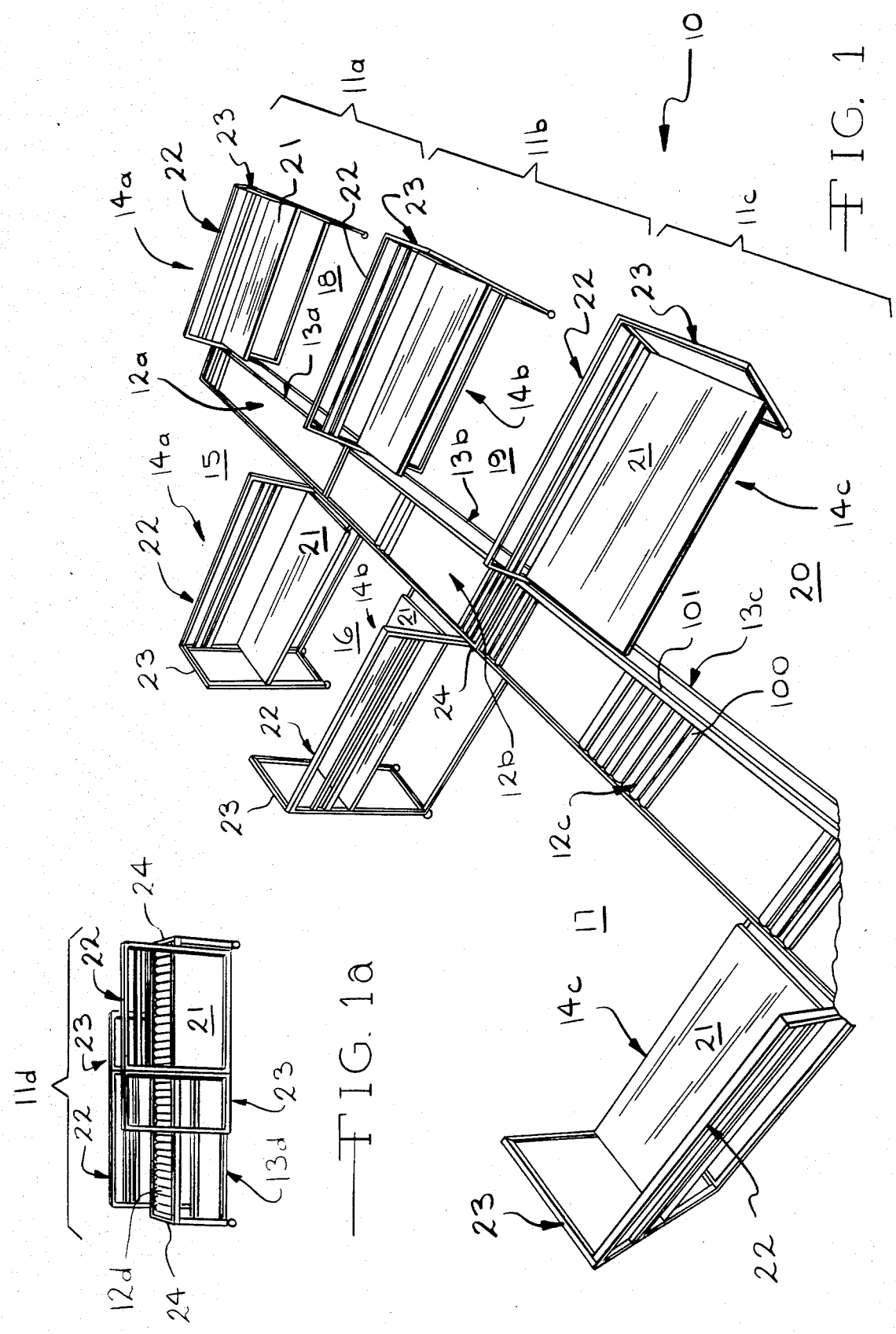
FIG. 1 is an isometric view of three joined modular units (11a, 11b, 11c) of the present invention each having the foldable panels (22, 23) mounted on a frame (13) supporting a conveyor surface (12).

The present invention relates to a portable and unfoldable modular unit to be joined to similar modular units for providing work stations (15, 16, 17, 18, 19 and 20) which comprises:

(a) a central divider having opposite ends (24) and sides located between the ends; and (b) at least one vertically oriented panel (22) mounted on one side of the central divider by hinge means (201) so as to be unfoldable on a vertical axis into an open position at a 90° angle away from a line (2—2) between the ends of the central divider to provide the work stations and so as to be foldable on the vertical axis parallel to the line between the ends. The preferred central divider is frame (13) supporting a conveyor surface (12); however, it will be appreciated that other dividers such as cabinets, tables, walls and the like can provide with the panels (22) various work stations on either or both sides of the central divider.

The present invention particularly relates to a portable and unfoldable modular unit (11) including a combined conveyor and work station (15, 16, 17, 18, 19, 20) which comprises:

(a) a conveyor including a frame (13) supporting a conveyor surface (12) between opposite ends (24) of the frame at a pre-selected height of the frame;

(b) a vertically oriented first panel (22) mounted on the frame by first hinge means (201) so as to be unfoldable on a vertical axis into an open position at a 90° angle away from the conveyor surface and so as to be foldable on the vertical axis parallel to a line (2—2) between the ends of the conveyor surface;

(c) a vertically oriented second panel (23) mounted on the first panel by second hinge means (200) so as to be in an open position at a 90° angle from the first panel and parallel to the line between the ends of the conveyor surface and so as to be foldable parallel to the line between the ends of the conveyor surface; and (d) a work surface (21) hinged on the first panel by first retaining means (202) such that when the work surface is folded the surface is parallel to the first panel and when in an open position is at approximately a 60° to 90° angle to the first panel; and (e) second retaining means (204) mounted on the work surface which detachably connect to the frame and second panel to hold the work surface in the open position, wherein when the work surface is folded the first and second panels can be folded to be positioned parallel with the line between the ends of the conveyor surface in order to provide the unit in a folded portable configuration.

SPECIFIC DESCRIPTION

Referring to FIGS. 1 and 1a, the preferred conveyor system 10 is shown including modular units 11a, 11b, 11c, and 11d. Each unit includes a conveyor surface 12a, 12b, 12c and 12d supported by frames 13a, 13b, 13c and 13d. Each modular unit 11a, 11b and 11c includes one or more identical foldable sections 14a, 14b and 14c which provide work stations 15, 16, 17, 18, 19 and 20 adjacent the conveyor work surfaces 12a, 12b and 12c. Each section 14a, 14b, 14c and 14d preferably includes a work surface 21 supported by first panel 22 and second panel 23. The ends 24 of each subunit 11a, 11b and 11c are joined together to form a conveyor system 10 as shown in FIG. 1.

FIGS. 2 to 6 show the details of construction of a typical unfolded modular unit 11a (FIGS. 2 and 3) or a folded modular unit 11d (FIGS. 4 to 6). The conveyor surfaces 12a or 12c include rollers 100 joined to side rails 101 by means of pins 102 on rollers 101 in a conventional manner. The frame 13a, 13b, 13c or 13d includes vertical tubular frame members 103, 104 and horizontal tubular frame members 105, 106, 107 and 108 which support the rail 101 with the work surface 12a or 12d between ends 24 as shown in FIG. 5.

Figure 10:
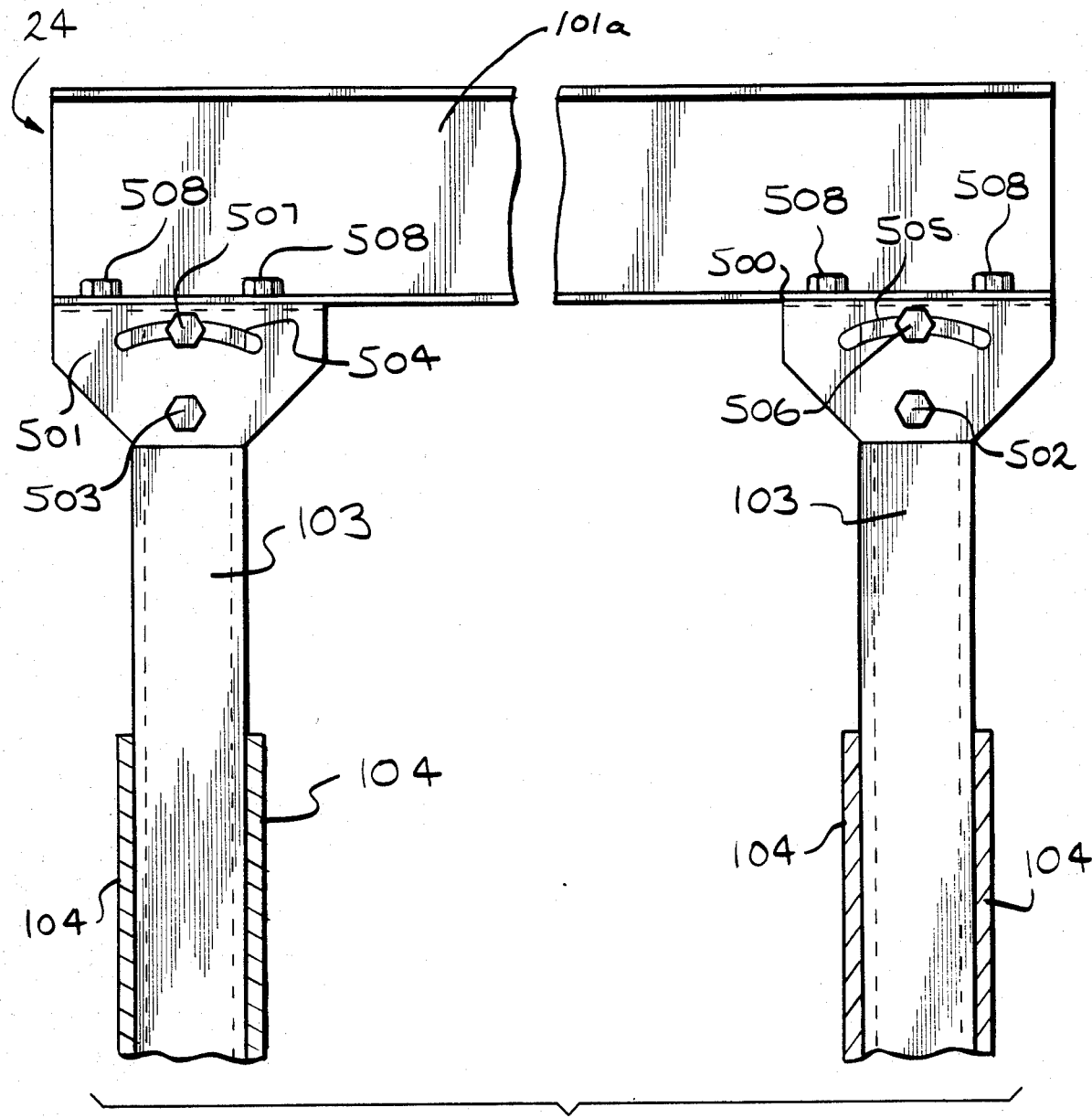
FIG. 10 is a front view of an articulating means so that the height of the ends 24 can be changed relative to each other.

The vertical tubular frame members 103 and 104 are constructed such that one vertical tubular member 103 telescopes into or from the other vertical tubular frame member 104 to change the vertical height of the conveyor surface 12a, 12b, 12c or 12d. As shown in FIG. 10, the members 103 can be optionally pivoted on the side rail 101a so that the ends 24 of the conveyor surface 12a, 12b or 12c can be at a different vertical height from ground level. An articulating means includes plates 500 and 501 supported by pivot pins or bolts 502 and 503 mounted on frame member 103. The plates 500 and 501 support a horizontal frame member 101a. Pins 506 and 507 engage slots in plates 500 and 501 to limit angular movement. The articulating means is a standard "smile" bracket manufactured by Versa-Ferguson, Mt. Sterling, Ohio. The length between the brackets can be changed by loosening bolts 508 and plates 500 and 501 have slots (not shown) which are engaged by the bolts 508.

The metal tubular members 104 are fitted with lockable casters or rollers 109. As shown in FIG. 6, optionally the frame 13d can include a storage platform 110 mounted horizontally on top of horizontal frame members 107.

Figure 2:
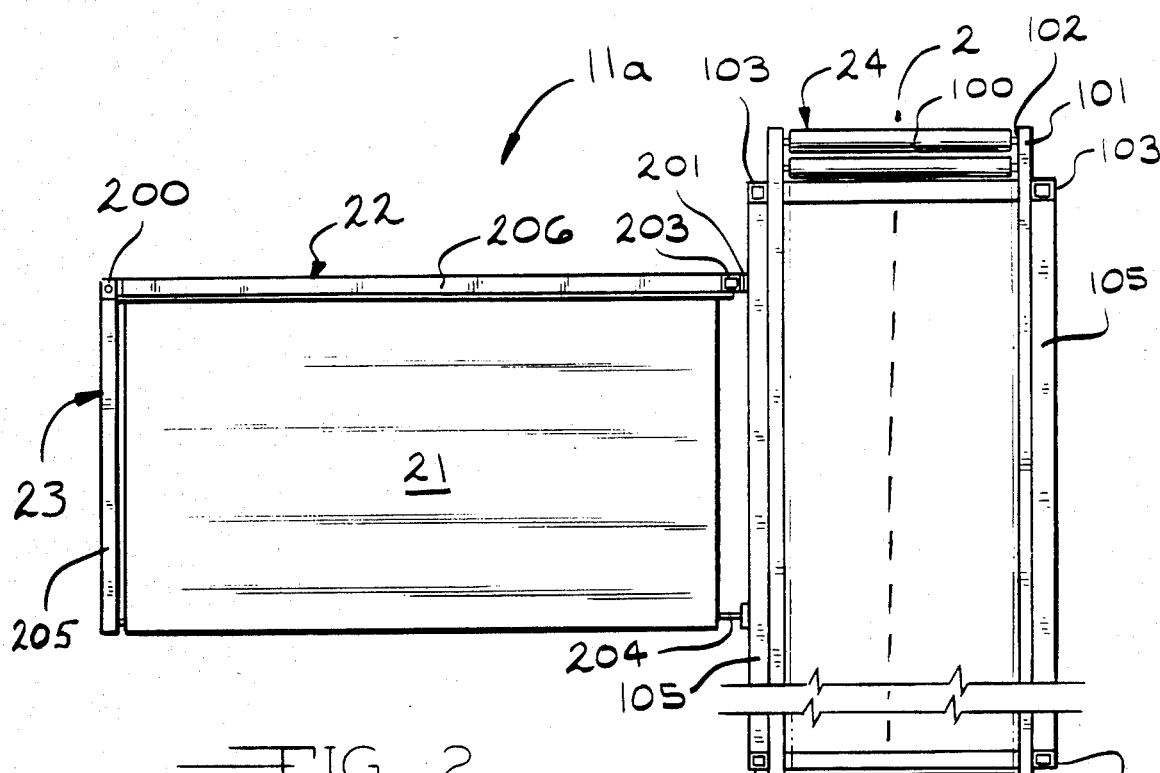
FIG. 2 is a plan view of one of the modular units (11a) illustrating one of the foldable panels (22, 23) and a work surface (21).

As shown in FIG. 2, the first vertically oriented first panel member 22 is joined to second vertically oriented panel member 23 by means of a hinge 200. The first member 22 is connected to horizontal tubular members 105 and 106 of the frame 13a by means of hinges 201 which are shown in more detail in FIGS. 7 and 8. The work surface 21 is connected to panel 22 by means of first sliding latch pins 202 which slide into vertically oriented first panel tubular members 203 so that the work surface 21 folds down into the panel 22 as shown in FIGS. 4 to 6. Second sliding latch pins 204 engage vertically oriented second panel tubular member 210 and side rail 101 to provide the work surface 21 in a generally horizontal position (60° to 90°). Thus the work surface 21 can be completely removed from the first and second panel members 22 and 23. The second panel member 23 is provided with horizontal tubular members 205 and the first panel member is provided with horizontal tubular members 206 and 207 to complete the panels 22 and 23. Above the work surface 21, a pair of horizontal parallel tubular members 208 and 209 are provided for hanging parts bins and the like (not shown). The second panel 23 is provided with adjustable threaded floor supports 211 as are known to those skilled in the art which can be removed and moved away from ground level when the unit 11a, 11b, 11c or 11d is in the folded position.

Figure 3:
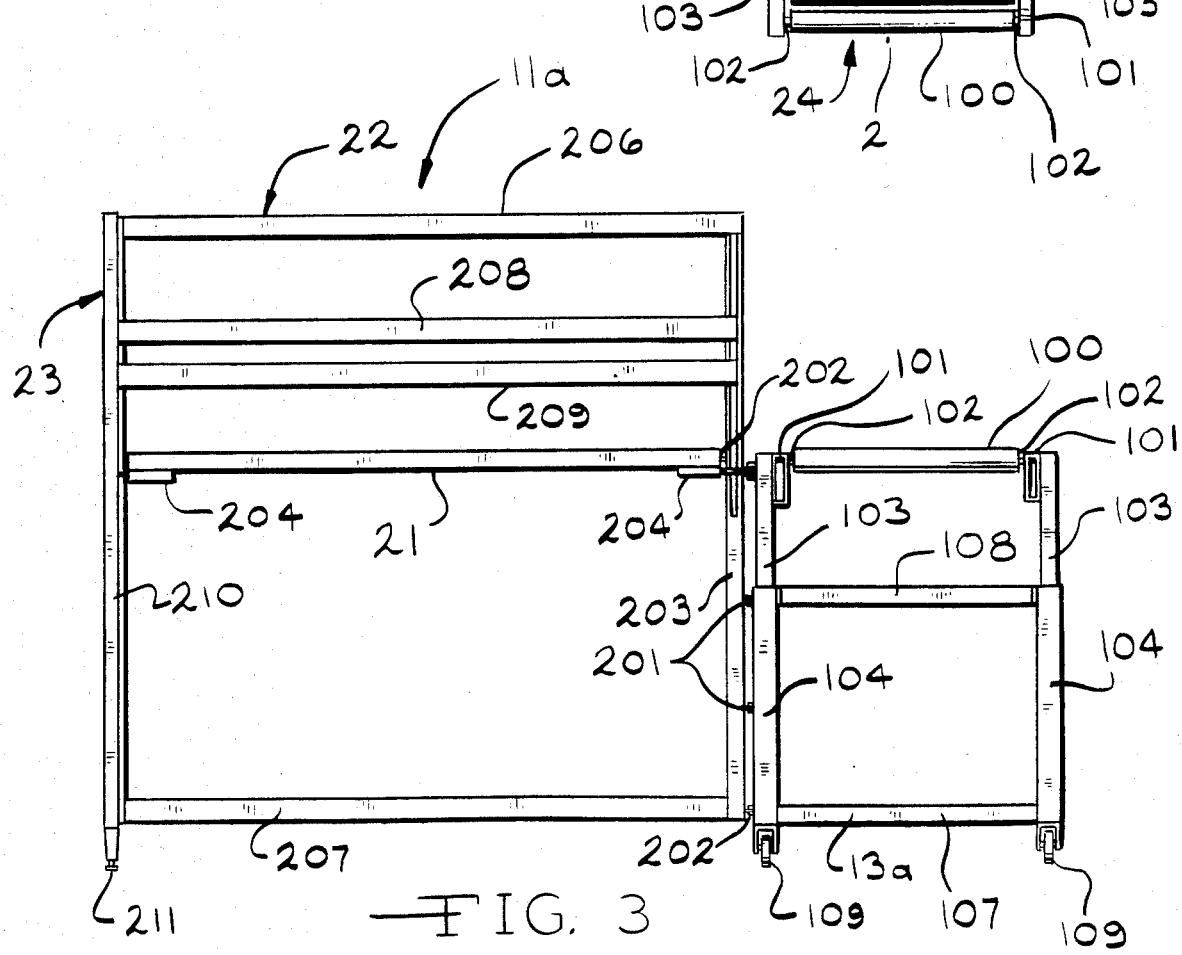
FIG. 3 is an end view of the modular unit (11a) of FIG. 2 in the open position.

As shown in FIGS. 4 to 6, the table 21 folds down between the tubular members 203, 206 and 207 of the first panel 23 by releasing latch pins 204. The panels 22 and 23 of FIGS. 2 and 3 are folded into the position of FIGS. 4, 5 and 6. Thus as viewed in plan view the first panel 23 in the open position is at a 90° angle from the conveyor surface as seen in the plan view of FIG. 2 and is foldable on a vertical axis to be parallel to a line (2—2) between the ends 24 of the conveyor surface. The second panel 23 is mounted on the first panel so as to be in an open position at a 90° angle from the first panel and parallel to the line 2—2 between the ends 24 of the conveyor subunit 11 as seen in plan view and so as to be foldable on a vertical axis parallel to the line 2—2 between the ends 24 of the conveyor surface 12 as seen in plan view in FIGS. 2 and 4.

Figure 7:
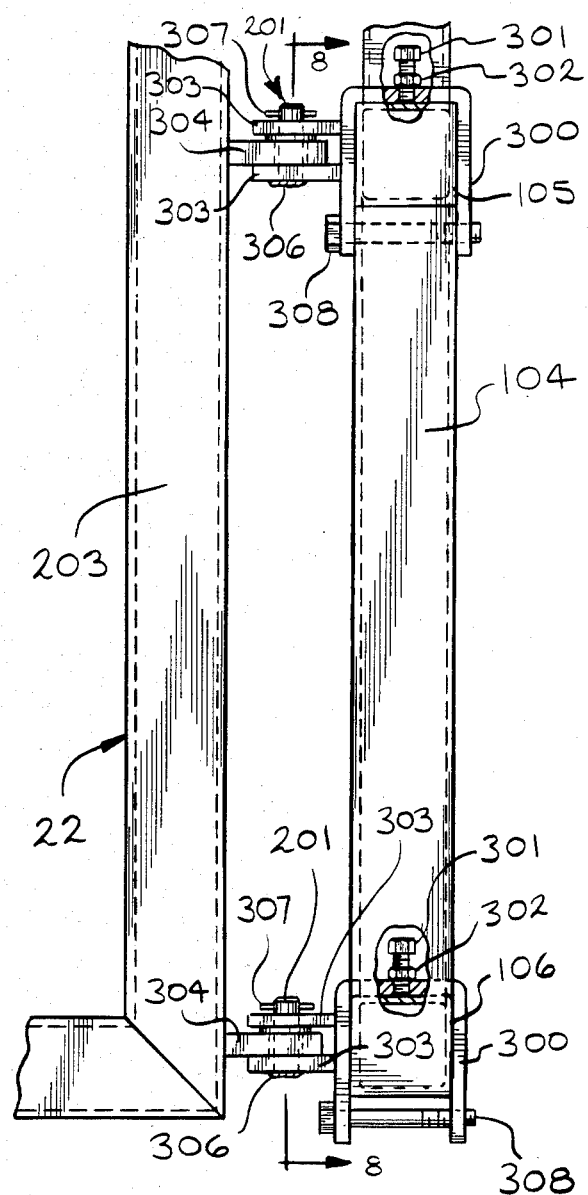
FIG. 7 is an end view in partial section of FIG. 3, particularly illustrating horizontally slideable hinge means (201) particularly clamps (300) mounted on horizontal frame members (105, 106).
Figure 8:
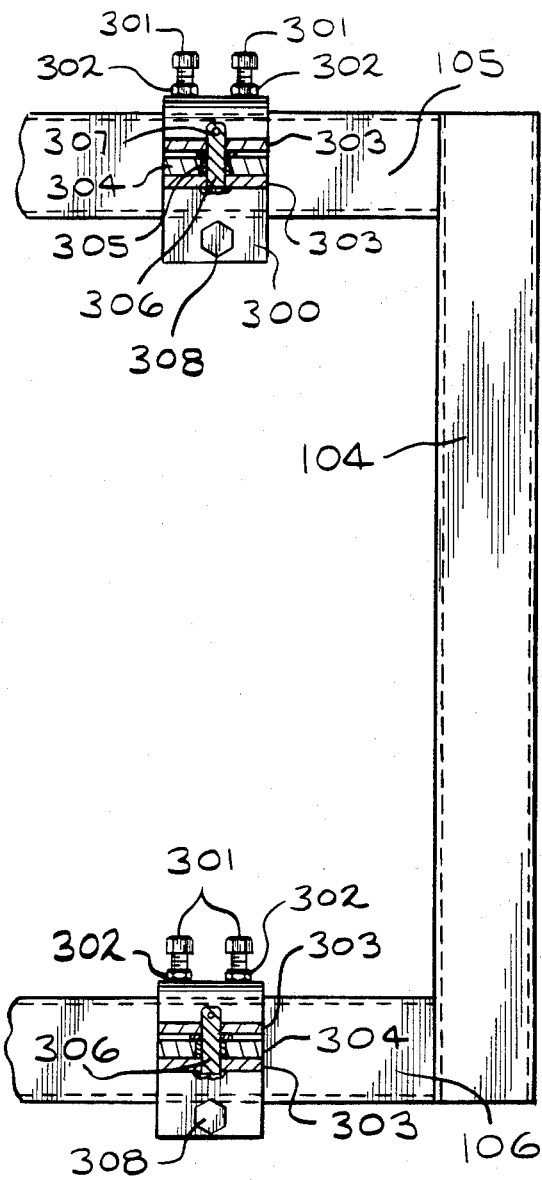
FIG. 8 is a front view along line 8—8 of FIG. 7 showing the slideable hinge means (201) mounted on the frame members (105, 106) of the conveyor surface.

Referring to FIGS. 7 and 8, the details of the construction of the hinges 201 are shown. Metal clamps 300 fit around horizontal frame tubular members 105 and 106 and are held in place by lock bolts 308 so as to be slideable along the length thereof when the bolts 308 are loosened. The clamps 300 are provided with set bolts 301 and lock nuts 302 which engage the horizontal tubular members 105 and 106 to hold the clamps 300 in position. Projecting from the clamps 300 are spaced apart parallel hinge plates 303. The panel member 22 also has a hinge plate 304 on vertical tubular member 203 which fits between plates 303. The plates 303 and 304 are provided with aligned holes 305 for pin 306 which is held in place by cotter pin 307 through a hole (not shown) in pin 306. Thus the panel 22 can be positioned anywhere along the length of tubes 105 and 106 intermediate the ends 24.

Figure 9:
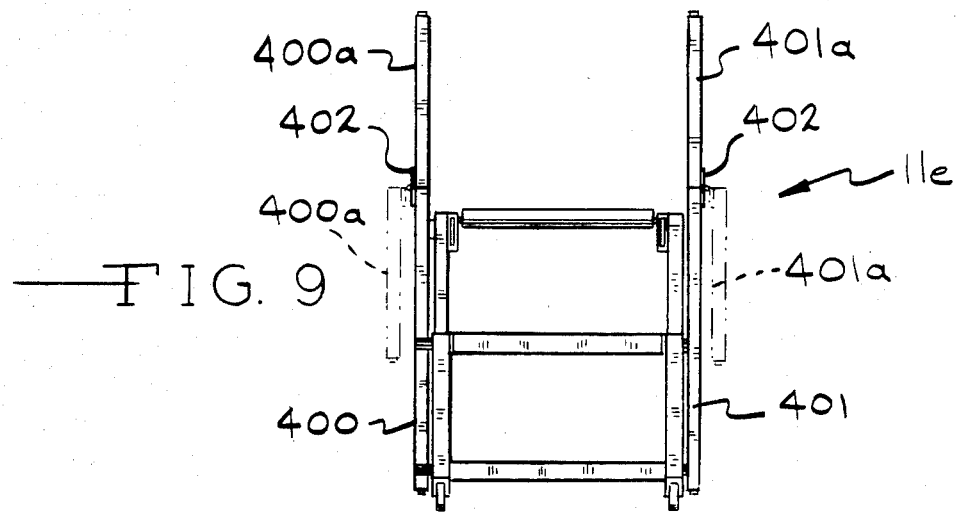
FIG. 9 is an end view showing a variation of the panels (22, 23) as shown in FIG. 1a such that the panels (400, 401) refold along a line parallel to the axis 2—2 as shown in FIGS. 2 or 4 between the ends (24) of the modular unit.

Referring to FIG. 9, a variation of FIGS. 1 to 6 is shown. In this modular unit 11e first and second panels 400 and 401 are adapted so that sections 400a and 401a fold down (as shown by the dotted lines) at hinge 402 to make the unit 11e still more compact. In this folded configuration multiple modular units 11e can be stacked one above the other for storage.

The work surface 21 can be adjustable in height by providing multiple holes (not shown) in the first panel 22 tubular members 203 and second panel 23 tubular members 210 into which the sliding latch pins 204 is inserted. Also, if all of the pins 202 and 204 are released, the work surface 21 can be removed from the modular units 11.

As will be appreciated, the panels 22, 23, 400 or 401 can be solid, however the tubular construction of FIGS. 1 to 9 is preferred for weight reduction purposes. Also, the panels 22 and 23 on one side of the modular unit 11 can be removed so that the unit 11 will fit against a wall (not shown). The removed panels 22 and 23 can be reattached to the side away from the wall. Further, it will be appreciated that the work surface 21 can be eliminated if it is not needed as can the second panels 23 or 401. Various hinge 201 and latch pin 202 and 204 means or other attachment means can be used. The rollers 109 can be eliminated. The clamps 300 can be fixed in position; however, this is not preferred. The conveyor system can include a single drive means (not shown) mounted on one modular unit 11 which drives all of the rollers the rest of the units 11, such as by means of a conventional rotating shaft along the conveyor line with drive belts around the rollers. Further belt or other types of conveyors can be used to provide the conveyor surface 12. The conveyor frame 13 and/or panels 22 and 23 can be provided with electric, pneumatic or hydraulic lines for powering the conveyor or for use at the work stations 15 to 20. All of these variations will be obvious to one skilled in the art and are included within the scope of the present invention.

I claim:

1. A portable and unfoldable modular unit (11) including a combined conveyor and work station (15, 16, 17, 18, 19, 20) which comprises:
   (a) a conveyor including a frame (13) supporting a conveyor surface (12) between opposite ends (24) of the frame at a pre-selected height of the frame;
   (b) a vertically oriented first panel (22) mounted on the frame by first hinge means (201) so as to be unfoldable on a vertical axis into an open position at a 90° angle away from the conveyor surface and so as to be foldable on the vertical axis into a position parallel to a line (2—2) between the ends of the conveyor surface;
   (c) a vertically oriented second panel (23) mounted on the first panel by second hinge means (200) so as to be in an open position at a 90° angle from the first panel and parallel to the line between the ends of the conveyor surface and so as to be foldable into a position parallel to the line between the ends of the conveyor surface;
   (d) a work surface (21) hinged on the first panel by first retaining means (202) such that when the work surface is folded the surface is parallel to the first panel and when in an open position is at approximately a 60° to 90° angle to the first panel; and
   (e) second retaining means (204) mounted on the work surface which detachably connect to the frame and second panel to hold the work surface in the open position, wherein when the work surface is folded the first and second panels can be folded to be positioned parallel with the line between the ends of the conveyor surface in order to provide the unit in a folded portable configuration.

2. The modular unit of claim 1 wherein the frame is mounted on casters (109) to provide for rolling movement of the modular unit in the folded portable configuration.

3. The modular unit of claim 2 wherein the casters are lockable to prevent rolling when the panels and work surface are in an open position and wherein the panels have height adjustable floor supports (211) for holding the panels in position.

4. The modular unit of claim 1 wherein the height of the conveyor surface is adjustable between ends (24) of the conveyor surface by telescoping tubular members (103, 104) which are part of the frame and wherein the height can be adjusted differently at the ends of the conveyor surface by articulating means (500, 501).

5. The modular unit of claim 1 wherein the conveyor surface includes multiple spaced apart parallel rollers (100) positioned to roll along the line between the ends.

6. The modular unit of claim 1 wherein first and second panels are constructed of tubular members (203, 205, 206, 207, 210) and wherein the first hinge means are mounted on vertical tubular members (203) as part of the first panel member and on the frame.

7. The modular unit of claim 6 wherein in addition at least one horizontal support tubular member (208, 209) is provided on the first panel parallel to and above the work surface in the open position.

8. The modular unit of claim 6 wherein the tubular members are square or rectangular in cross-section.

9. The modular unit of claim 1 wherein the work surface connects to the frame and to the second panel by means of spring loaded sliding pins as the first and second retaining means.

10. The modular unit of claim 1 wherein in addition the frame of the modular unit includes a horizontal shelf (110) mounted beneath the conveyor surface.

11. The modular unit of claim 1 wherein each modular unit includes two sets of folding first and second panels each with the work surface and wherein one set is mounted at each end of and on opposite sides of the conveyor surface on the frame.

12. The modular unit of claim 1 wherein the first retaining means are sliding latches which engage the vertical tubular members (203) forming the first panel such that the work surface can be rapidly removed from the first panel.

13. The modular unit of claim 1 wherein the hinge means is a clamp (300) mounted around horizontal tubes (105, 106) positioned along the line between the ends of the frame and wherein the clamp is provided with holding means (301, 302) to secure the clamp in position on the tubes.

14. A portable and unfoldable modular unit in a conveyor system linked with at least one additional identical modular unit to provide a conveyor line with multiple work stations wherein the modular unit includes a combined conveyor and work station which comprises:
   (a) a conveyor including a frame (13) supporting a conveyor surface (12) between opposite ends (24) of the frame at a pre-selected height of the frames;
   (b) a vertically oriented first panel (22) mounted on the frame by first hinge means (201) so as to be unfoldable on a vertical axis into an open position at a 90° angle away from the conveyor surface and so as to be foldable on the vertical axis into a position parallel to a line (2—2) between the ends of the conveyor surface;

(c) a vertically oriented second panel (23) mounted on the first panel by second hinge means (200) so as to be in an open position at 90° angle from the first panel and parallel to the line between the ends of the conveyor surface and so as to be foldable into a position parallel to the line between the ends of the conveyor surface;

(d) a work surface (21) hinged on the first panel by first retaining means (202) such that when the work surface is folded the surface is parallel to the first panel and when in an open position is at approximately a 60° to 90° angle to the first panel; and (e) second retaining means (204) mounted on the work surface which detachably connect to the frame and second panel to hold the work surface in the open position wherein when the work surface is folded the first and second panels can be folded to be positioned parallel with the line between the ends of the conveyor surface in order to provide the unit in a folded portable configuration.

* * * * *